(12) United States Patent
Tajima et al.

(10) Patent No.: US 11,404,981 B2
(45) Date of Patent: Aug. 2, 2022

(54) MOTOR CONTROLLER

(71) Applicant: FANUC CORPORATION, Yamanashi (JP)

(72) Inventors: Daisuke Tajima, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 27 days.

(21) Appl. No.: 17/038,227

(22) Filed: Sep. 30, 2020

(65) Prior Publication Data

US 2021/0126565 A1   Apr. 29, 2021

(30) Foreign Application Priority Data

Oct. 24, 2019   (JP) .............................. JP2019-193254

(51) Int. Cl.
*H02P 6/24*   (2006.01)
*H02P 6/30*   (2016.01)

(52) U.S. Cl.
CPC .   *H02P 6/24* (2013.01); *H02P 6/30* (2016.02)

(58) Field of Classification Search
CPC .... H02P 6/24; H02P 6/30; H02P 23/24; H02P 3/18; H02P 23/18; H02P 23/20; H02P 3/06
USPC ................. 318/400.06, 400.01, 400.04, 700
See application file for complete search history.

(56) References Cited

U.S. PATENT DOCUMENTS 5,663,621 A * 9/1997 Popat .................. H04L 12/2816
318/648
8,120,292 B2 * 2/2012 Berman .................... E06B 9/68
318/280

FOREIGN PATENT DOCUMENTS

JP         2948830 B2    9/1999
JP     2012-175808 A    9/2012

* cited by examiner

*Primary Examiner* — David Luo
(74) *Attorney, Agent, or Firm* — Studebaker & Brackett PC (57) ABSTRACT

The present disclosure provides a motor controller which can effectively stop a motor at a specific position in a short period of time, and can achieve an orientation operation quickly. A motor controller is configured to stop a rotary shaft, and includes: a first time period calculator that calculates a target stop position and an acceleration at a time of positioning, a first time period that is to be taken by the rotary shaft to stop at the target stop position; a second time period calculation unit that calculates the target stop position and the acceleration at the time of positioning, a second time period that is to be taken by the rotary shaft to stop at the target stop position; a comparison unit that compares the first time period with the second period; and an orientated stop control unit that controls and stops the motor.

2 Claims, 9 Drawing Sheets

MOTOR CONTROLLER

This application is based on and claims the benefit of priority from Japanese Patent Application No. 2019-193254, filed on 24 Oct. 2019, the content of which is incorporated herein by reference.

BACKGROUND OF THE INVENTION

Field of the Invention

The present invention relates to a motor controller.

Related Art

Servo motors are included in industrial machines. For example, the servo motor is used to drive a spindle of a machine tool so that a rotation number, a speed and a torque are controlled. A servo motor controller drives and controls the servo motor by detecting a position of the motor and a pole position (a phase (angle) of a motor magnet) by way of a detector, determining a voltage directive value based on various feedback values provided from the detector, and applying a voltage modulated by a pulse width modulation (PWM) method.

On the other hand, there is a technique for controlling an operation of stopping an industrial machine at a specific position, i.e., the so-called orientation operation (oriented stop operation). According to this technique, for example, in response to an orientation command, a maximum deceleration control operation is performed by causing a maximum current to flow to the motor, a maximum negative acceleration is detected, and a state value is acquired with which the oriented stop is achieved in a shortest period of time. Then, based on the state value, a command for stopping the machine at the specific position is calculated, and the motor is driven and controlled according to the calculated command. This technique has been put in practical use.

For example, Japanese Patent No. 2948830 discloses a method for controlling a spindle motor for driving a disc-shaped storage medium, the method including, when the spindle motor is to be stopped; stopping application of a drive current for clockwise rotation and applying a drive current for counterclockwise rotation; detecting a rotational speed and a rotational acceleration of the spindle motor and computing a required time period and a required number of rotations that are required until the spindle motor stops; and in a case where the required number of rotations becomes smaller than a predetermined value, stopping the application of the drive current for counterclockwise drive upon elapse of the required time period for the stop from that point of time.

Japanese Unexamined Patent Application, Publication No. 2012-175808 discloses a controller for controlling stop of motors, the controller being intended for use in a processing line provided with a plurality of motors including a first motor for driving a loading machine that loads a continuous material and a second motor for driving a winding machine that winds up the continuous material, and a motor driving device for controlling the motors, the controller being configured to bring the motors to an emergency stop. This controller includes: an input unit to which coil diameter information of coils of the loading machine and the winding machine and rotational number information of the motors are inputted in real time; a storage unit in which rating of the motors and moment of inert of a machine unit connected to the motors are stored in advance; a stop period computing unit which computes, based on the information inputted to the input unit and the information stored in the storage unit, stopping periods of time in a case of performing regenerative braking on the motors with a predetermined constant torque at that point of time; a torque limit value computing unit which identifies a maximum among the stopping periods of time of the motors computed by the stop period computing unit, and which computes, for the motors, torque limit values for implementing stop in accordance with the identified maximum stopping period of time; and an output unit which outputs, in response to input of an emergency stop command for stopping the processing line, the torque limit values computed by the torque limit value computing unit to the motor driving device so as to cause the motor driving device to perform regenerative braking with a torque limited to the torque limit values.

Patent Document 1: Japanese Patent No. 2948830
Patent Document 2: Japanese Unexamined Patent Application, Publication No. 2012-175808

SUMMARY OF THE INVENTION

Here, according to the above technique for controlling the orientation operation, in order to stop the motor of interest at a specific position effectively in a short period of time, the maximum deceleration controlling operation is carried out by causing the maximum current to flow to the motor, in response to the orientation command.

However, it is difficult to stop the motor at the specific position with accuracy in a state where the maximum deceleration controlling operation is carried out with the maximum current flowing to the motor. As a result, it may take a long time to stop the motor at the specific position, thereby lowering the productivity.

For this reason, a technique has been desired which can effectively stop a motor at a specific position in a short period of time.

An aspect of the present invention is directed to a motor controller for controlling a motor, the motor controller being configured to stop a rotary shaft rotating at a predetermined speed at a specified position in response to a stop command. The motor controller includes: a first time period calculator that calculates, based on a current speed, a target stop position and an acceleration at a time of positioning, a first time period that is to be taken by the rotary shaft to stop at the target stop position without change of a rotation direction of the rotary shaft; a second time period calculation unit that calculates, based on the current speed, the target stop position and the acceleration at the time of positioning, a second time period that is to be taken by the rotary shaft to stop at the target stop position after a temporary halt and rotation in an opposite direction subsequent to the temporary halt; a comparison unit that compares the first time period with the second period; and an orientated stop control unit that controls and stops, based on a result of comparison by the comparison unit, the motor such that the rotary shaft stops at the target stop position in a shorter period of time.

The motor controller according to one aspect of the present disclosure can effectively stop the motor, and accordingly, an industrial machine driven by the motor at a specific position in a short period of time. Thus, the motor controller can achieve an orientation operation more quickly.

DETAILED DESCRIPTION OF THE INVENTION

A motor controller according to an embodiment will be described below with reference to FIGS. 1 to 9.

The present embodiment is directed to a motor controller that controls, for example, a motor for driving a spindle of a machine tool (a rotary shaft of an industrial machine), and that is configured to satisfactorily control an orientation operation (oriented stop operation) in which, for example, the spindle is stopped at a specific position where tool replacement can be performed when the tool replacement is needed.

It should be noted that the motor controller of the present disclosure is only required to be capable of controlling the orientation operation of an industrial machine including a motor (rotary shaft). The motor controller is not limited to the application to the machine tool, but is usable to drive and control of a motor of other industrial machines, such as robots, conveyors, measuring instruments, testing apparatuses, pressing machines, press-fitting machines, printers, die casting machines, injection molding machines, food machines, packaging machines, welders, cleaning machines, painting machines, assembling machines, mounting machines, woodworking machines, sealing machines and cutting machines. Further, the motor does not necessarily have to be a servo motor.

Figure 1:
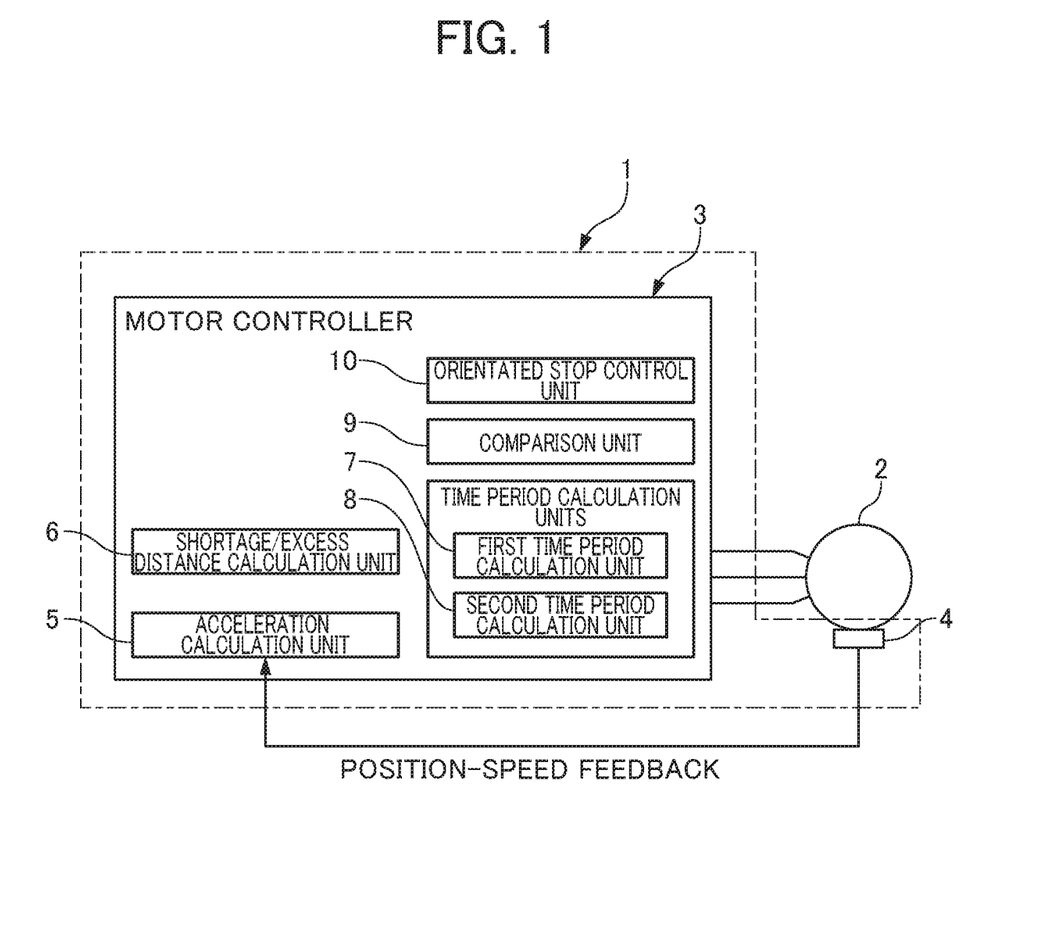
FIG. 1 is a block diagram showing a motor controller according to an embodiment.

As shown in FIG. 1, a machine tool control system 1 of the present embodiment includes a motor controller 3 that is configured to control, based on a command from a computerized numerical control (CNC) of a command unit, a motor 2 for driving a spindle (rotary shaft) or the like of a machine tool, and to control an orientation operation (oriented stop operation).

The motor controller 3 of the present embodiment includes a speed detector 4 for detecting a speed of the spindle (rotary shaft) driven by the motor 2, and an acceleration calculation unit 5 for calculating an acceleration based on the speed detected by the speed detector 4. A target stop position is set for the motor controller 3 upon reception of an orientation command.

The motor controller 3 of the present embodiment further includes: a shortage/excess distance calculation unit 6 that calculates, in response to the orientation command, a shortage or an excess of distance with respect to the target stop position based on a current speed, the target stop position and an acceleration at the time of positioning; a first time period calculation unit 7 that calculates, in response to the orientation command, a first time period that is to be taken by the rotary shaft (spindle) to stop at the target stop position without change of a rotation direction, based on the current speed, the target stop position and the acceleration at the time of positioning; a second time period calculation unit 8 that calculates, based on the current speed, the target stop position and the acceleration at the time of positioning, a second time period that is to be taken by the rotary shaft to stop at the target stop position after a temporary halt and subsequent rotation in the counterclockwise direction; a comparison unit 9 that compares the first time period with the second time period; and an orientated stop control unit 10 that controls and stops the motor 2 such that the rotary shaft stops at the target stop position in a shorter period of time, based on the comparison result of the comparison unit 9.

The motor controller 3 of the present embodiment is configured such that: following the reception of the orientation command (oriented stop command), the motor controller 3 switches from speed control to position control at a predetermined speed; at the time of the switching, the motor controller 3 determines the first time period and the second time period according to the current speed, a distance (angle) to the target position (command position) and the acceleration at the time of positioning; and the motor controller 3 selects an operation with which a positioning period of time is minimized.

<Calculation of First Time Period>

Specifically, the first time period calculation unit 7 of the motor controller 3 according to the present embodiment calculates the first time period in the following manner.

Figure 2:
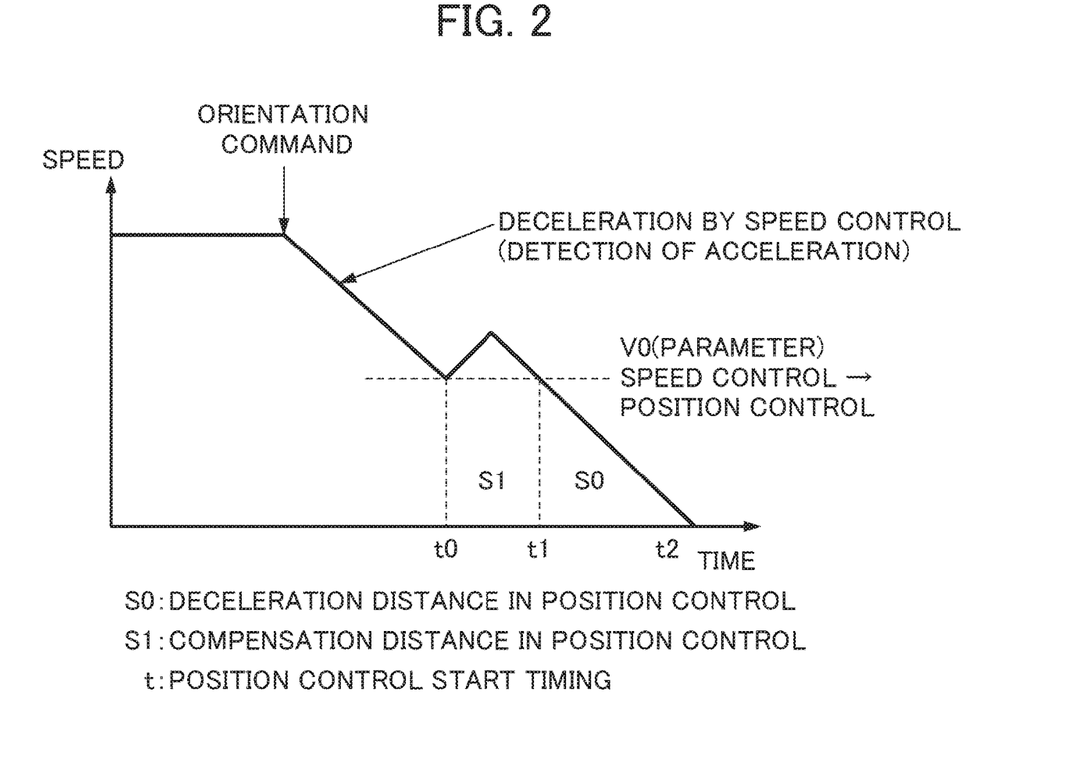
FIG. 2 is a graph showing a relationship between speed and time of control during a first time period.
Figure 3:
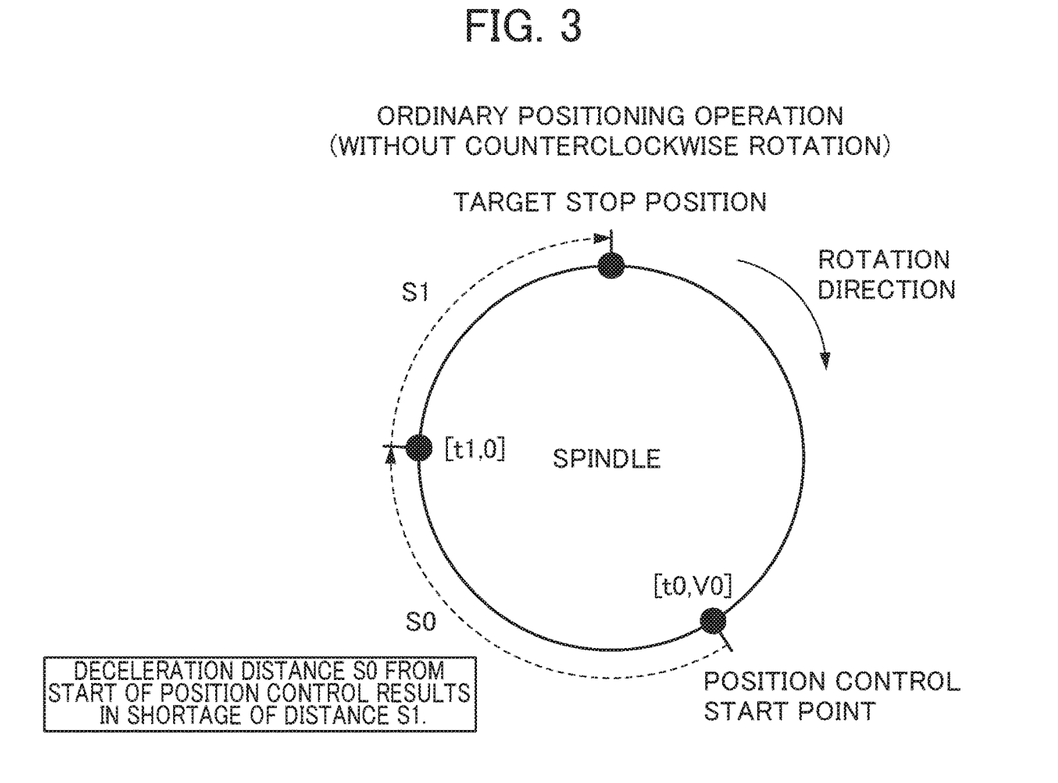
FIG. 3 is a diagram showing the control during the first time period.
Figure 4:
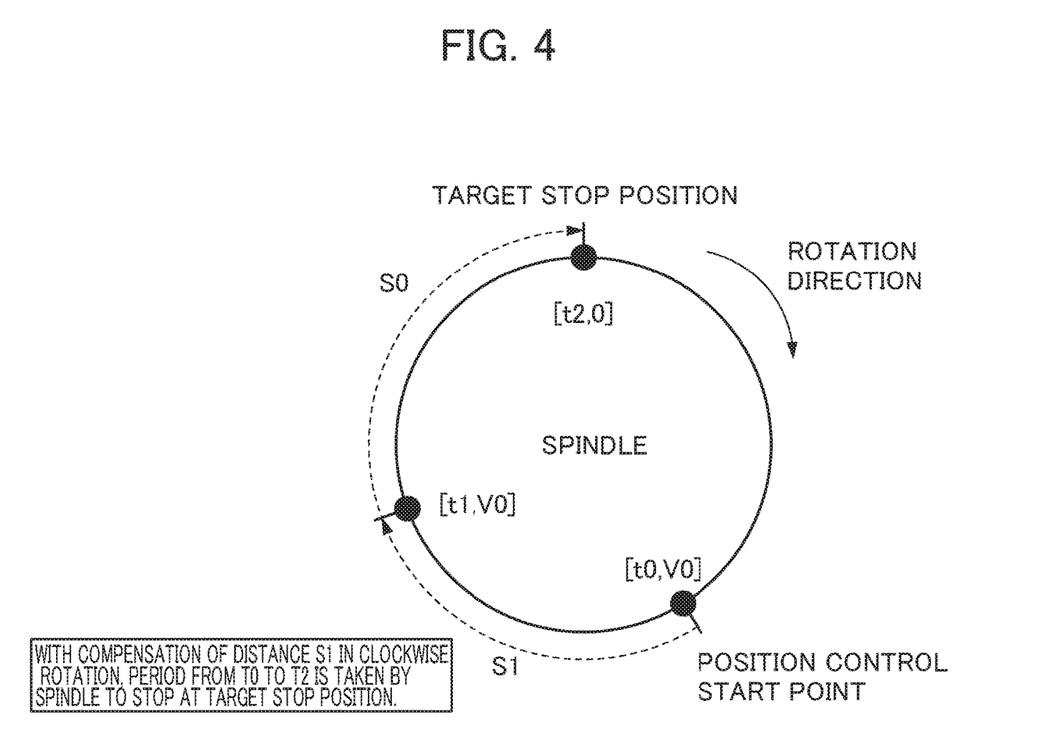
FIG. 4 is a diagram showing the control during the first time period.

As shown in FIGS. 2 to 4 (and FIG. 1), in response to the orientation command, the acceleration calculation unit 5 calculates, based on the current speed detected by the speed detector 4, an acceleration for decelerating and stopping the spindle with a maximum capability (intrinsic maximum torque) of the motor 2 from a position control start point. The orientated stop control unit 10 then decelerates and stops the motor 2 with this acceleration.

The shortage/excess distance calculation unit 6 calculates a shortage or an excess of distance with respect to the target stop position, with reference to a position at which the spindle is estimated to stop in the case where deceleration is begun from the position control start point in the above manner.

If the result of calculation by the shortage/excess distance calculation unit 6 shows that the spindle is estimated to stop at a position before and away from the target stop position by a distance S1 as a shortage, a transition from the state under speed control continuing from the reception of the orientation command to position control takes place such that the shortage of the distance S1 is compensated.

This transition from the speed control to the position control is implemented at a step (time t0) at which a preset speed V0 is reached as a result of deceleration with the maximum capability following the reception of the orientation command.

From the step at which a relationship described as (time, speed)=(t0, V0) is achieved, the orientated stop control unit 10 performs a compensation operation to implement a compensation corresponding to the distance S1 by way of acceleration or deceleration during a period of time (t1−t0). As a result of the compensation operation, the speed becomes equal to V0 at the time t1, and deceleration is implemented from the state described as (time, speed)=(t1, V0) so that the spindle is moved by a distance S0, whereby the spindle is stopped at the target stop position ((time, speed)=(t2, 0)).

As can be seen, if the result of calculation by the shortage/excess distance calculation unit 6 shows that a shortage by the distance S1 will be caused with respect to the target stop position, the orientated stop control unit 10 drives and controls, following the reception of the orientation command, the motor 2 such that the spindle is stopped at the target stop position by way only of the clockwise rotation of the axis of the motor 2, as shown in FIG. 2. The first time period calculation unit 7 calculates the first time period, which is the time period from the reception of the orientation command to the stop at the target stop position.

<Calculation of Second Time Period>

The second time period calculation unit 8 of the motor controller 3 according to the present embodiment calculates the second time period in the following manner.

Figure 5:
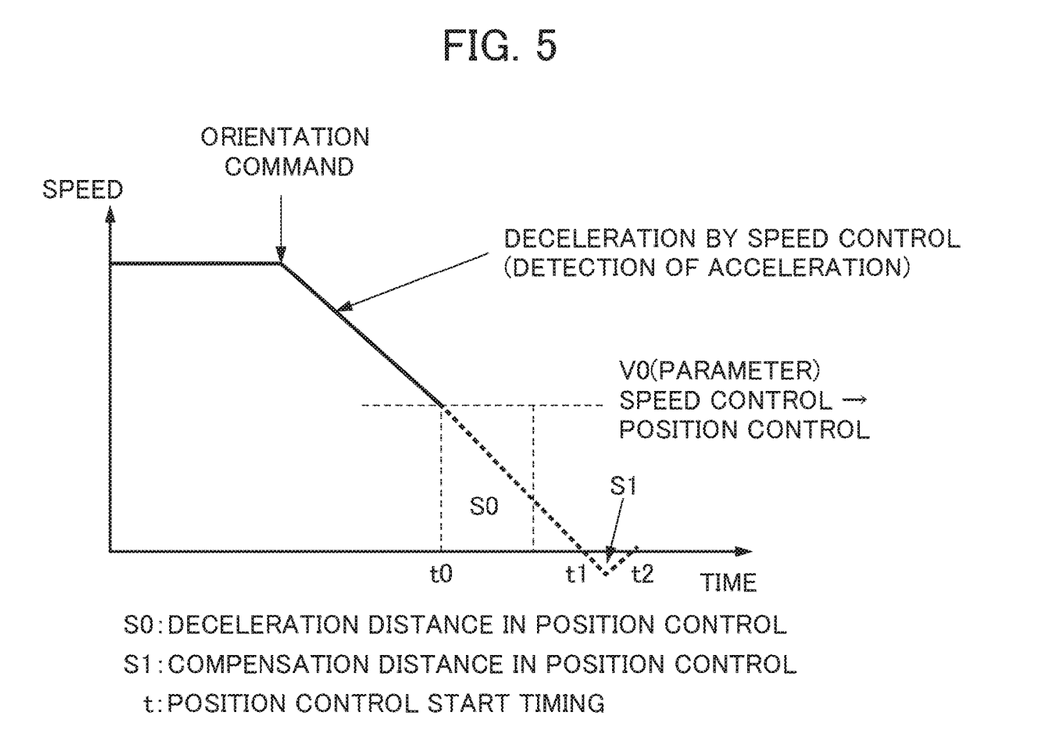
FIG. 5 is a graph showing a relationship between speed and time of control during a second time period.
Figure 6:
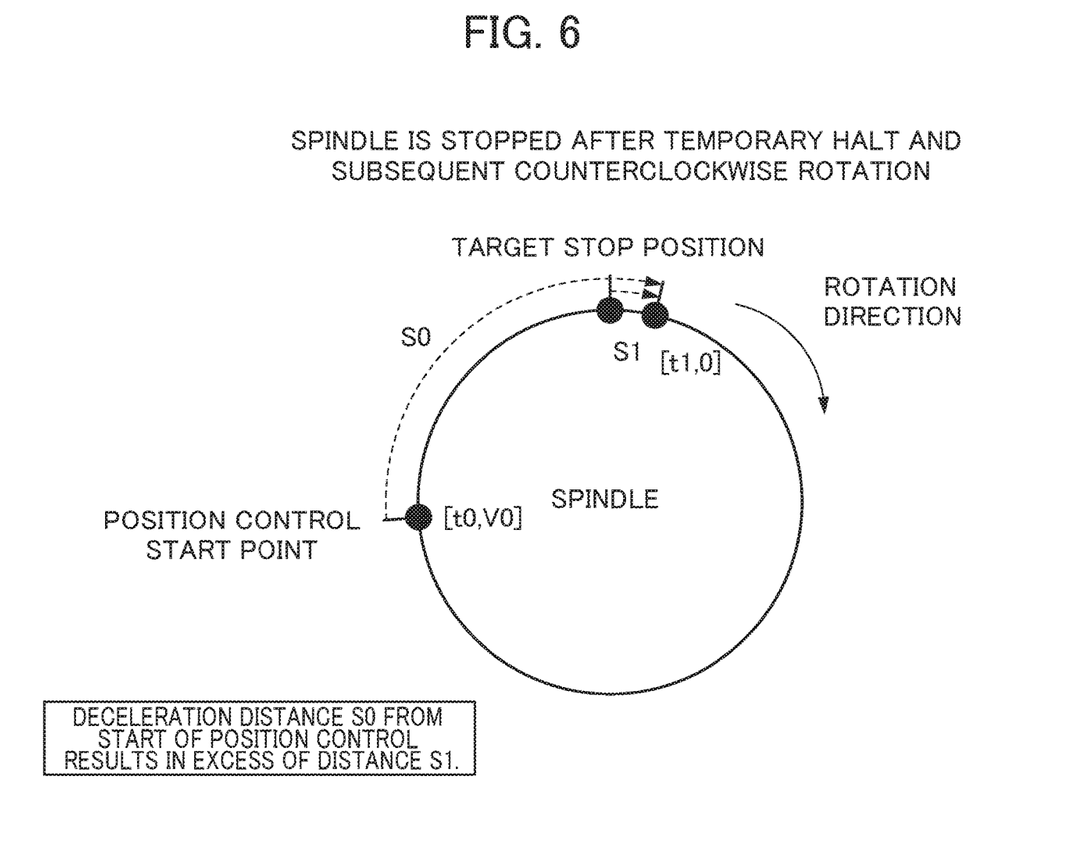
FIG. 6 is a diagram showing the control during the second time period.
Figure 7:
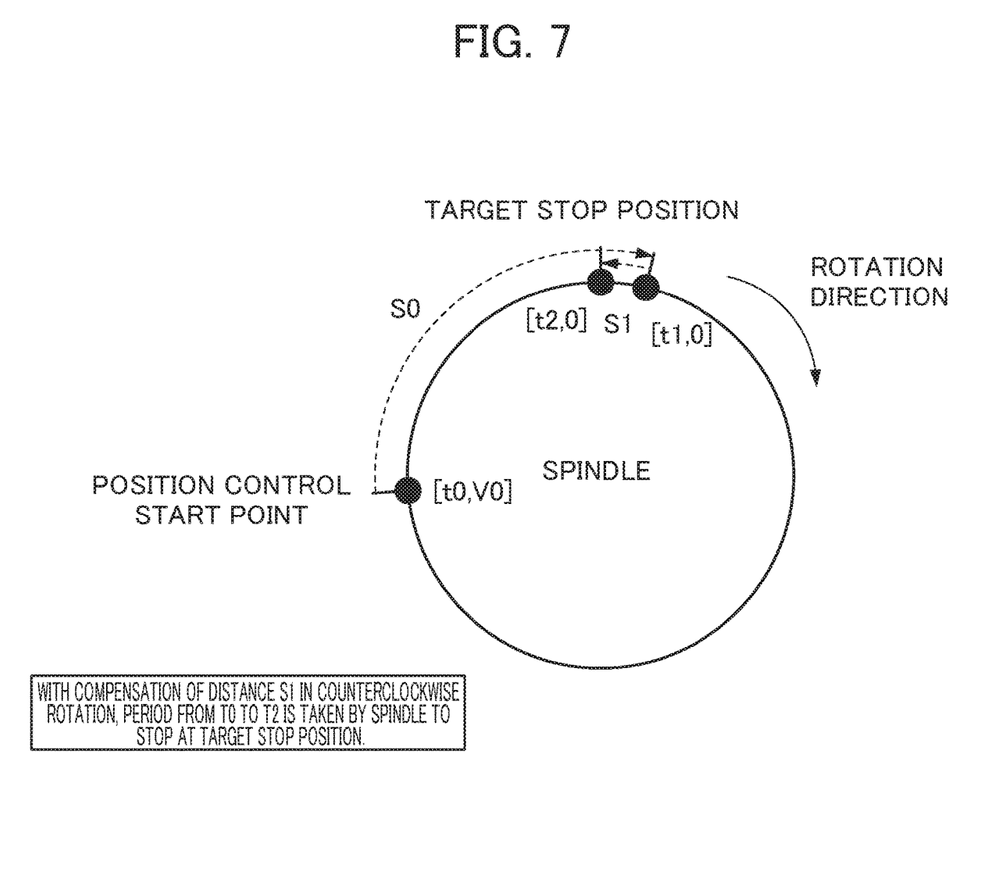
FIG. 7 is a diagram showing the control during the second time period.

As shown in FIGS. 5 to 7 (and FIG. 1), in response to the orientation command, the acceleration calculation unit 5 calculates, based on the current speed detected by the speed detector 4, an acceleration for decelerating and stopping the spindle with the maximum capability of the motor 2 from the position control start point. The orientated stop control unit 10 then decelerates and stops the motor 2 with this acceleration.

The shortage/excess distance calculation unit 6 calculates a shortage or an excess of distance with respect to the target stop position, with reference to a position at which the spindle is estimated to stop in the case where deceleration is begun from the position control start point in the above manner.

If the result of calculation by the shortage/excess distance calculation unit 6 shows that the spindle is estimated to stop at a position beyond and away from the target stop position by a distance S1 as an excess, a transition from the state under speed control continuing from the reception of the orientation command to position control takes place such that the excess of the distance S1 is compensated. Conventionally, if a calculation result shows that the spindle is estimated to stop at a position beyond and away from the target stop position by the distance S1, the spindle is controlled and caused to make a further one rotation before stopping at the target stop position. For this reason, a long time is taken by the spindle to stop at the target stop position, from the reception of the orientation command.

The above transition from the speed control to the position control is implemented at a step (time t0) at which the preset speed V0 is reached as a result of deceleration with the maximum capability following the reception of the orientation command.

From the step at which a relationship described as (time, speed)=(t0, V0) is achieved, the orientated stop control unit 10 continues deceleration to move the spindle by a distance S0 so that the spindle passes by the target stop position, and then, stops the spindle temporarily. From the point (time, speed)=(t1, 0) reached as a result of movement by the distance S0, the orientated stop control unit 10 performs a compensation operation to rotate the spindle in the counterclockwise direction by a distance S1 by way of acceleration or deceleration, whereby the spindle is stopped at the target stop position ((time, speed)=(t2, 0)).

As can be seen, if the result of calculation by the shortage/excess distance calculation unit 6 shows that an excess by the distance S1 will be caused with respect to the target stop position, the orientated stop control unit 10 drives and controls, following the reception of the orientation command, the motor 2 such that the spindle is stopped at the target stop position by way of a combination of clockwise and counterclockwise rotations of the axis of the motor 2, as shown in FIG. 5. The second time period calculation unit 8 calculates the second time period, which is the time period from the reception of the orientation command to the stop at the target stop position.

<Selection of Stop Control Operation>

Next, the comparison unit 9 compares the thus calculated first and second time periods with each other, and determines which one is shorter than the other. An operation associated with the shorter one of the first and second time periods is selected, and the orientated stop control unit 10 controls and stops the motor 2 such that the spindle stops at the target stop position in the selected shorter time period.

In this way, the motor controller 3 of the present embodiment can effectively stop the spindle at the specific position in a short period of time. That is, with the motor controller 3, an orientation operation can be achieved more quickly.

One embodiment of the motor controller has been described in the foregoing. It should be noted that the present disclosure is not limited to the embodiment described above, and modifications can be appropriately made without deviating from the spirit of the present disclosure.

Figure 8:
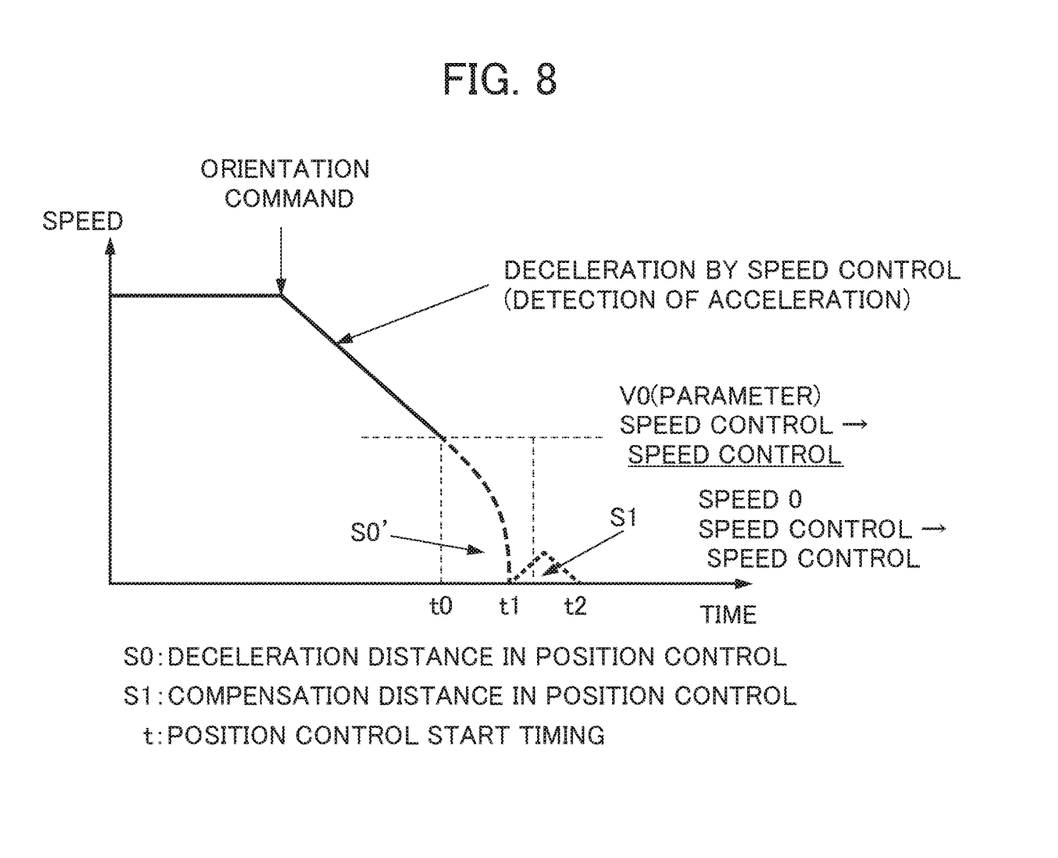
FIG. 8 is a graph showing a relationship between speed and time of the control during the first time period, according to a modification.
Figure 9:
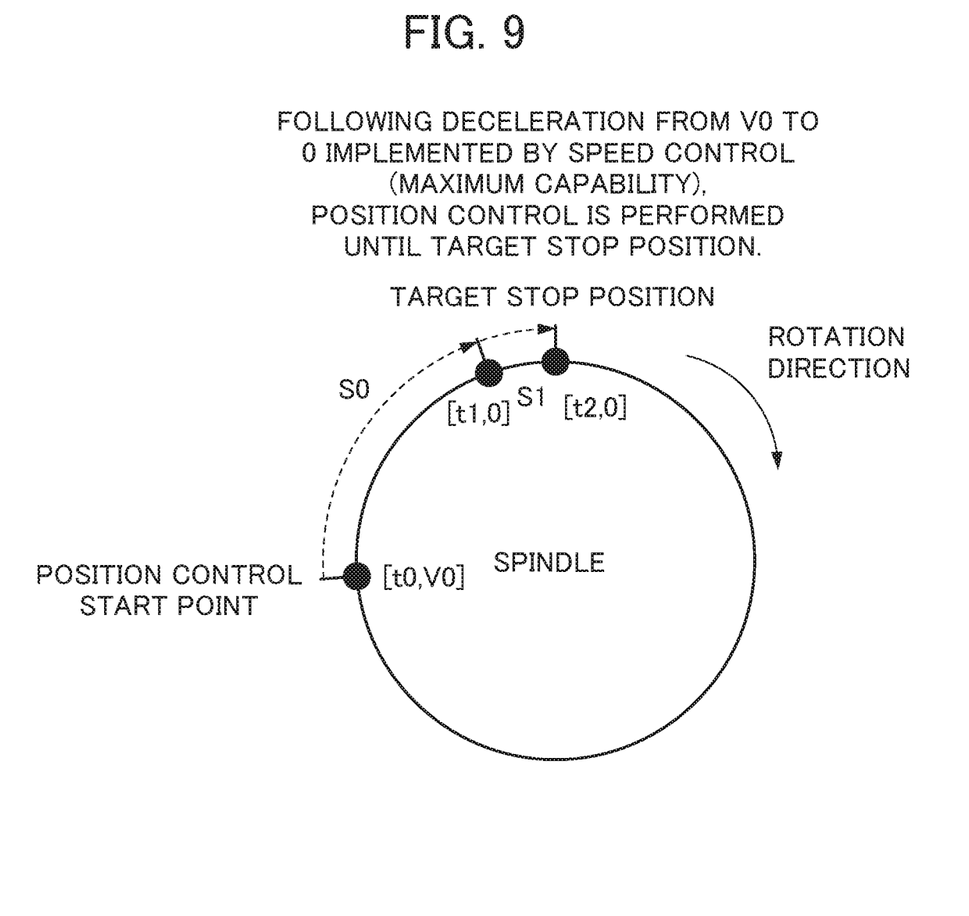
FIG. 9 is a diagram showing control during the first time period, according to the modification.

For example, as shown in FIGS. 8 and 9, the spindle may be controlled in the following way: in response to an orientation command, speed control is performed with the maximum deceleration so that a speed V0 is reached at a step (time t0); from the step (t0), the speed control is continued to stop the spindle after movement by a distance S0' with the maximum deceleration ((time, speed)=(t1, 0)); at this step, the speed control is switched to the position control so that the spindle is moved by a distance S1 as a shortage so as to be stopped at the target stop position. Thus, a period of time from the reception of the orientation command to the stop of the spindle by way only of the clockwise rotation of the axis of the motor 2 may be set as the first time period.

If the deceleration with the maximum capability of the motor causes an excess of distance, a configuration is suitably adopted in which the motor is rotated in the counterclockwise direction to compensate the excess.

EXPLANATION OF REFERENCE NUMERALS

1: Industrial Machine Control System
2: Motor
3: Motor Controller
4: Speed Detector
5: Acceleration Calculation Unit
6: Shortage/Excess Distance Calculation Unit
7: First Time Period Calculation Unit
8: Second Time Period Calculation Unit
9: Comparison Unit
10: Orientated Stop Control Unit

What is claimed is:

1. A motor controller for controlling a motor, the motor controller being configured to stop a rotary shaft rotating at a predetermined speed at a specified position in response to a stop command, the motor controller comprising:
   a first time period calculator that calculates, based on a current speed, a target stop position and an acceleration at a time of positioning, a first time period that is to be taken by the rotary shaft to stop at the target stop position without change of a rotation direction of the rotary shaft;
   a second time period calculation unit that calculates, based on the current speed, the target stop position and the acceleration at the time of positioning, a second time period that is to be taken by the rotary shaft to stop at the target stop position after a temporary halt and rotation in an opposite direction subsequent to the temporary halt;

a comparison unit that compares the first time period with the second period; and an orientated stop control unit that controls and stops, based on a result of comparison by the comparison unit, the motor such that the rotary shaft stops at the target stop position in a shorter period of time.

2. The motor controller according to claim 1, wherein if it is determined that the second time period is shorter than the first time period, the motor controller decelerates and stops the rotary shaft with a maximum capability, and thereafter, rotates the rotary shaft by a shorter distance to the target stop position, thereby positioning the rotary shaft.

\* \* \* \* \*